US009428143B2

(12) United States Patent
Sparling

(10) Patent No.: US 9,428,143 B2
(45) Date of Patent: Aug. 30, 2016

(54) SEAT WITH UPWARDLY PROJECTING HARNESS STRAPS

(71) Applicant: Chad Allen Sparling, Ortonville, MI (US)

(72) Inventor: Chad Allen Sparling, Ortonville, MI (US)

(73) Assignee: RECARO CHILD SAFETY LLC, Auburn Hills, MI (US)

( * ) Notice: Subject to any disclaimer, the term of this patent is extended or adjusted under 35 U.S.C. 154(b) by 30 days.

(21) Appl. No.: 14/324,461

(22) Filed: Jul. 7, 2014

(65) Prior Publication Data
US 2015/0028648 A1 Jan. 29, 2015

Related U.S. Application Data

(60) Provisional application No. 61/858,764, filed on Jul. 26, 2013.

(51) Int. Cl.
| B60R 22/02 | (2006.01) |
| B60R 22/12 | (2006.01) |
| B60N 2/28 | (2006.01) |
| B60N 2/26 | (2006.01) |

(52) U.S. Cl.
CPC ............. *B60R 22/12* (2013.01); *B60N 2/265* (2013.01); *B60N 2/2821* (2013.01); *B60N 2/2851* (2013.01); *B60N 2002/2818* (2013.01); *B60R 2022/021* (2013.01)

(58) Field of Classification Search
CPC ............ B60R 22/12; B60R 2022/021; B60N 2/2812; B60N 2/265; B60N 2/2821; B60N 2/2851; B60N 2002/2818
USPC ...................................................... 297/250.1
See application file for complete search history.

(56) References Cited

U.S. PATENT DOCUMENTS

| 3,206,247 | A | * | 9/1965 | Johnson | A47D 1/02 297/254 |
| 3,596,986 | A | * | 8/1971 | Ragsdale | A47D 1/008 297/183.6 |
| 3,822,915 | A | * | 7/1974 | Colucci | B60R 22/26 280/806 |
| 3,934,934 | A | * | 1/1976 | Farrell, Jr. | B60N 2/2806 297/118 |
| 4,540,218 | A | * | 9/1985 | Thomas | B60N 2/2812 24/198 |
| 5,429,419 | A | * | 7/1995 | Kassai | B60N 2/2839 297/256.15 |
| 5,746,448 | A | | 5/1998 | Apfel | |
| 5,979,983 | A | * | 11/1999 | Galbreath | B60N 2/2812 297/256.15 |
| 6,742,848 | B2 | | 6/2004 | Ruff | |
| 6,893,088 | B2 | * | 5/2005 | Kassai | B60N 2/2806 297/250.1 |
| 7,350,862 | B2 | * | 4/2008 | Fransen | B60N 2/2812 297/216.11 |
| 7,445,286 | B2 | | 11/2008 | Siewertsen et al. | |
| 7,585,026 | B2 | * | 9/2009 | Kassai | B62B 5/082 297/250.1 |
| 7,648,208 | B2 | | 1/2010 | Weinstein et al. | |
| 7,735,919 | B2 | * | 6/2010 | Chen | B60N 2/2812 297/250.1 |
| 8,038,214 | B2 | * | 10/2011 | Brandl | B60N 2/2812 297/250.1 |

(Continued)

*Primary Examiner* — David R Dunn
*Assistant Examiner* — Tania Abraham
(74) *Attorney, Agent, or Firm* — Thompson Hine LLP

(57) ABSTRACT

A seat assembly is disclosed, and includes a seat having opposing sides, a back support, and a seat pan. The seat assembly also includes at least two harness straps extending in a generally vertical direction between the back support and the seat pan. The harness straps both have a lower portion and ends, where the ends of the harness straps are secured to the seat pan. An insert may be located within each of the harness straps. The inserts may extend in a generally upward direction away from the seat pan. The inserts are each a spring biased element that exerts a biasing force on a respective harness strap to urge the lower portion of the respective harness strap towards one of the opposing sides of the seat.

8 Claims, 6 Drawing Sheets

(56) References Cited

U.S. PATENT DOCUMENTS

| | | | | |
|---|---|---|---|---|
| 8,191,848 B2* | 6/2012 | McLoughlin | A62B 25/00 | 248/313 |
| 8,240,772 B2* | 8/2012 | Kawata | B60N 2/2812 | 297/219.12 |
| 8,419,127 B1* | 4/2013 | Wilhelm | B60R 22/02 | 280/808 |
| 9,114,738 B2* | 8/2015 | Franck | B60N 2/2806 | |
| 2001/0025400 A1* | 10/2001 | Romca | B60N 2/688 | 24/31 R |
| 2005/0179289 A1* | 8/2005 | Fuller | A47D 13/025 | 297/250.1 |
| 2007/0205650 A1 | 9/2007 | Weinstein | | |
| 2011/0006572 A1* | 1/2011 | Zhao | B60N 2/2812 | 297/256.15 |
| 2011/0037302 A1* | 2/2011 | Tharp | B60N 2/2812 | 297/256.15 |
| 2011/0133528 A1* | 6/2011 | Keith | B60N 2/2803 | 297/216.11 |
| 2011/0227392 A1* | 9/2011 | Morrissey | B60N 2/2812 | 297/482 |
| 2012/0019042 A1 | 1/2012 | Park | | |
| 2012/0019043 A1* | 1/2012 | Merrill | B64D 25/06 | 297/484 |
| 2013/0015691 A1* | 1/2013 | Feng | B60N 2/2812 | 297/256.15 |
| 2013/0285424 A1* | 10/2013 | Gardner | A47D 13/025 | 297/250.1 |
| 2013/0334852 A1* | 12/2013 | Miley | B60N 2/2806 | 297/250.1 |

* cited by examiner

SEAT WITH UPWARDLY PROJECTING HARNESS STRAPS

RELATED APPLICATIONS

This application claims the benefit of U.S. Provisional Application No. 61/858,764, filed on Jul. 26, 2013.

TECHNICAL FIELD

The disclosure relates generally to a seat having harness straps and, more particularly, to harness straps that project in a generally upward direction and "stand proud" with respect to a seat pan.

BACKGROUND

Child seats typically include two internal harness straps and a crotch strap, which are used to secure a child to the seat. Each of the harness straps is provided with a slidable tongue, and the crotch strap is provided with a buckle. The tongues of the harness straps are both selectively engaged by a latching mechanism located in the buckle of the crotch strap. A child may be secured to the seat by placing the harness straps over the arms and shoulders of the child, and then engaging the tongues of the harness straps by the latching mechanism in the buckle of the crotch strap. However, the child may inadvertently be positioned on top of one or both the tongues of the harness straps and/or the buckle of the crotch strap when the child is placed in the seat. Thus, the tongues and the buckle may be trapped or wedged underneath the child's body, making it difficult to effect latching the tongues to the buckle. The tongues and the buckle must be removed from underneath the child's body before securing the child to the seat, which can become time-consuming and inconvenient. Thus, there exists a need for improved harness straps and a crotch strap for a child seat.

SUMMARY

In one aspect, a seat assembly is disclosed, and includes a seat having opposing sides, a back support, and a seat pan. The seat assembly may also include at least two harness straps extending in a generally vertical direction between the back support and the seat pan. The harness straps may both have a lower portion and ends, where the ends of the harness straps may be secured to the seat pan. An insert may be located within each of the harness straps. The inserts may extend in a generally upward direction away from the seat pan. The inserts may each be a spring biased element that exerts a biasing force on a respective harness strap to urge the lower portion of the respective harness strap towards one of the opposing sides of the seat.

In another aspect, a seat assembly is disclosed, and includes a seat having opposing sides, a back support, and a seat pan. The seat assembly may also include at least two harness straps extending in a generally vertical direction between the back support and the seat pan. The harness straps may both have a lower portion and ends, where the ends of the harness straps may be secured to the seat pan. The seat assembly may also include a seat cover and an insert located between the seat cover and the seat pan. The inset may extend in a generally transverse direction between the at least two harness straps. An end of the insert receives the lower portion of one of the harness straps and another end of the insert receives the lower portion of a remaining one of the harness straps. The insert exerts a biasing force on both the harness straps to urge the lower portion of both harness straps towards one of the opposing sides of the seat.

DETAILED DESCRIPTION

Figure 1:
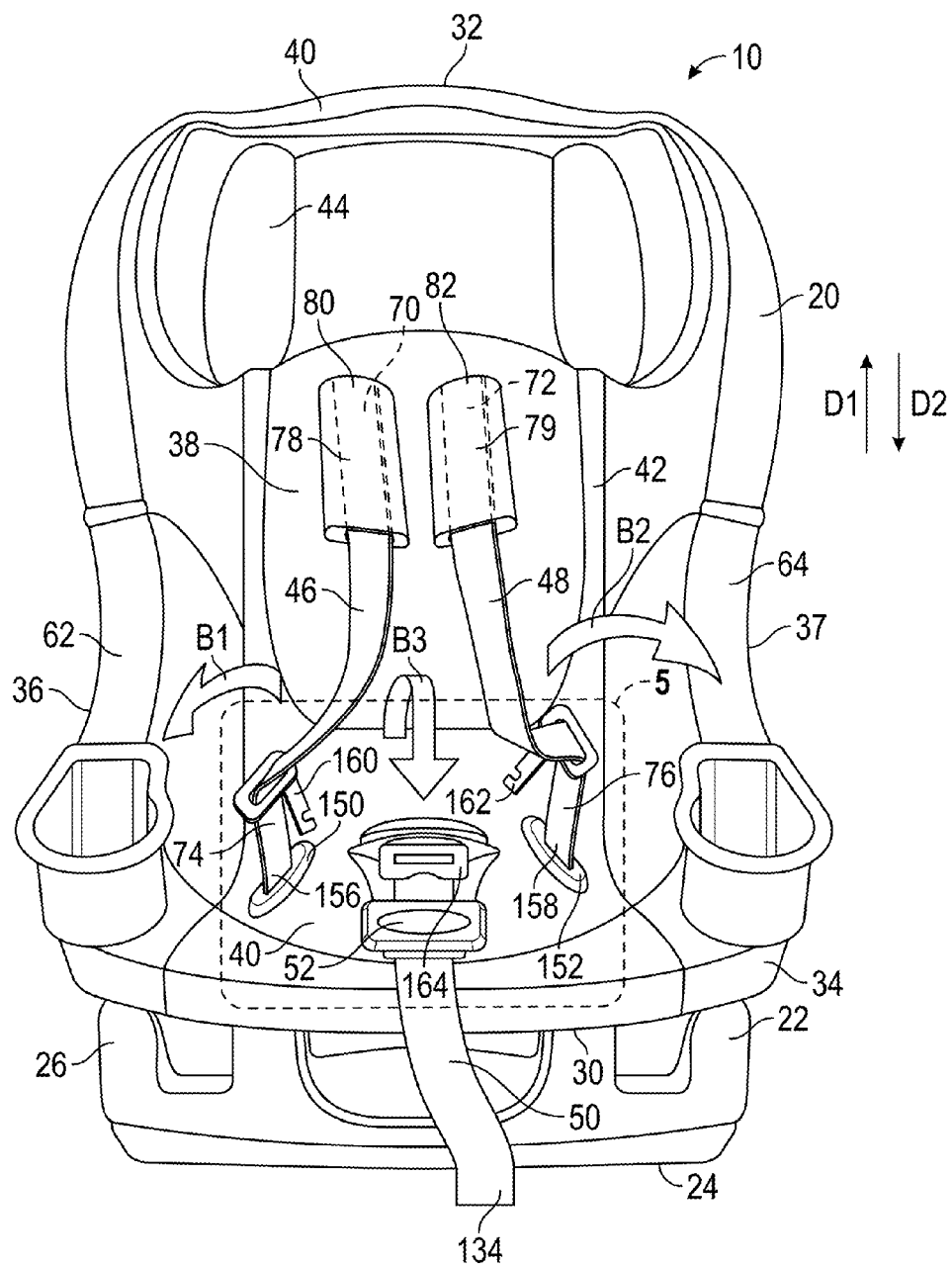
FIG. 1 is a front view of the disclosed child seat assembly.

As shown in FIG. 1, the disclosed child seat assembly, generally designated as 10, may include a seat 20 and a base 22. The base 22 may include a lower surface 24 and an upper portion 26. The base 22 may be adapted to be installed on a vehicle seat (not illustrated), where the lower surface 24 of the base 22 may rest against the vehicle seat. The upper portion 26 of the base 22 may selectively receive a bottom portion 30 of the seat 20. Although the seat 20 is illustrated as a child seat received by the base 20, it is to be understood that the base 22 may be omitted in one embodiment. The seat 20 may be any type of seat configured to secure a child or an infant such as, for example, an infant seat, a convertible seat, or a combination seat. It is understood that the seat 20 is not limited to child seating secured in a vehicle. For example, the seat 20 may be a stroller seat, a booster seat, or a high chair seat. Moreover, in an alternative embodiment, the seat 20 may be configured to secure an adult, such as a passenger seat in a motor vehicle or aircraft.

Figure 2:
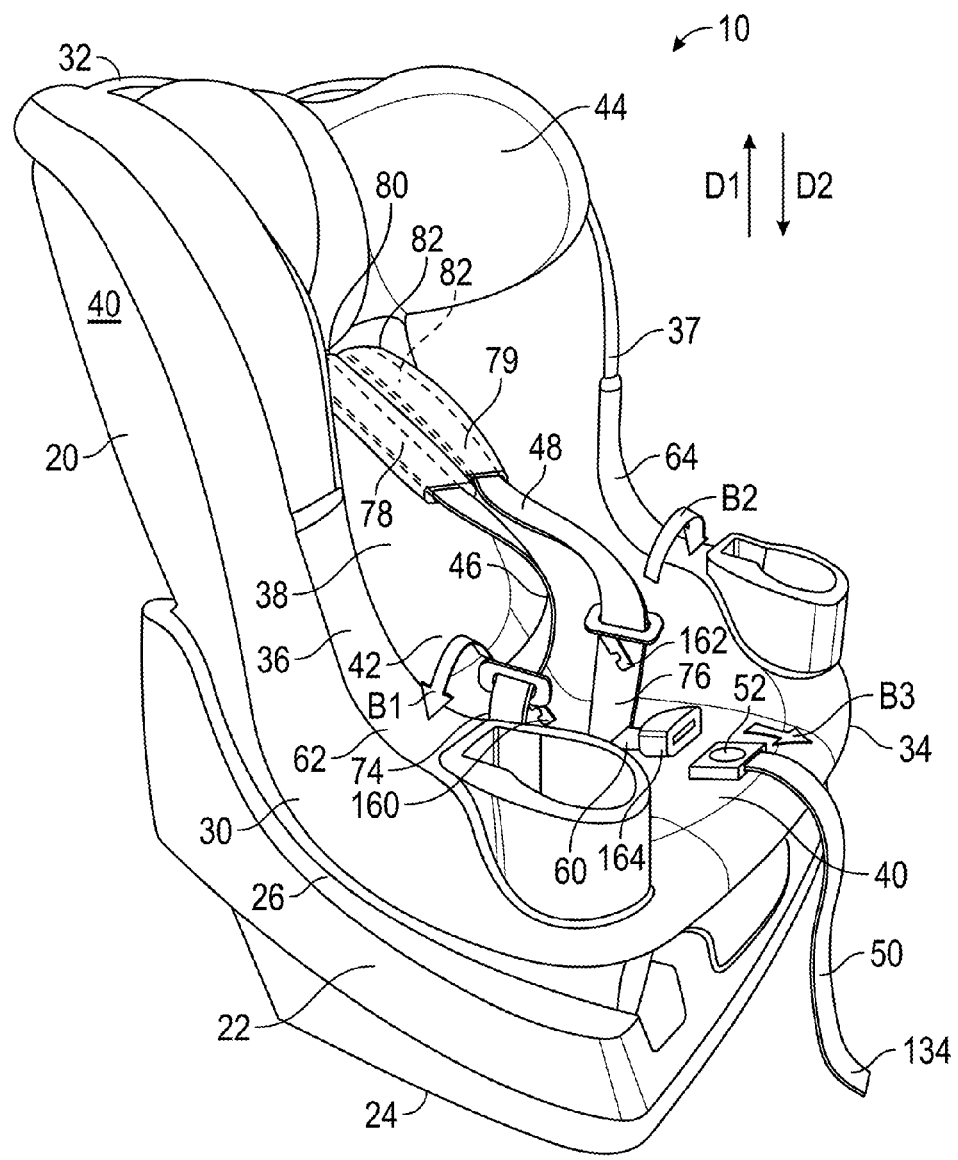
FIG. 2 is a left side perspective of the child seat assembly of FIG. 1, the right side being a mirror image thereof.

Referring to FIGS. 1-2, the seat 20 may have a head end 32, a foot end 34, two sides 36, 37, a back support 38, and a seat pan 40. The two sides 36, 37 of the seat 20 may be generally parallel to one another and extend between the head end 32 and the foot end 34. The seat 20 may include a cover 42 (which may be constructed of a suitable fabric or other pliable material), a headrest 44, two harness straps 46, 48, an adjuster strap 50, a web adjuster 52, a crotch strap 60 (seen in FIG. 2), and two arm rests 62, 64. The headrest 44 may be located at the head end 32 of the seat 20, and may be moveable in a first direction D1 towards the head end 32 of the seat, and a second direction D2 towards the bottom portion 30 of the seat 20. The armrest 60 may be located along the side 36 and the armrest 62 may be located along the side 37 of the seat 20. The crotch strap 60 (seen in FIG. 2) may be located on the seat pan 40 of the seat 20.

Figure 3:
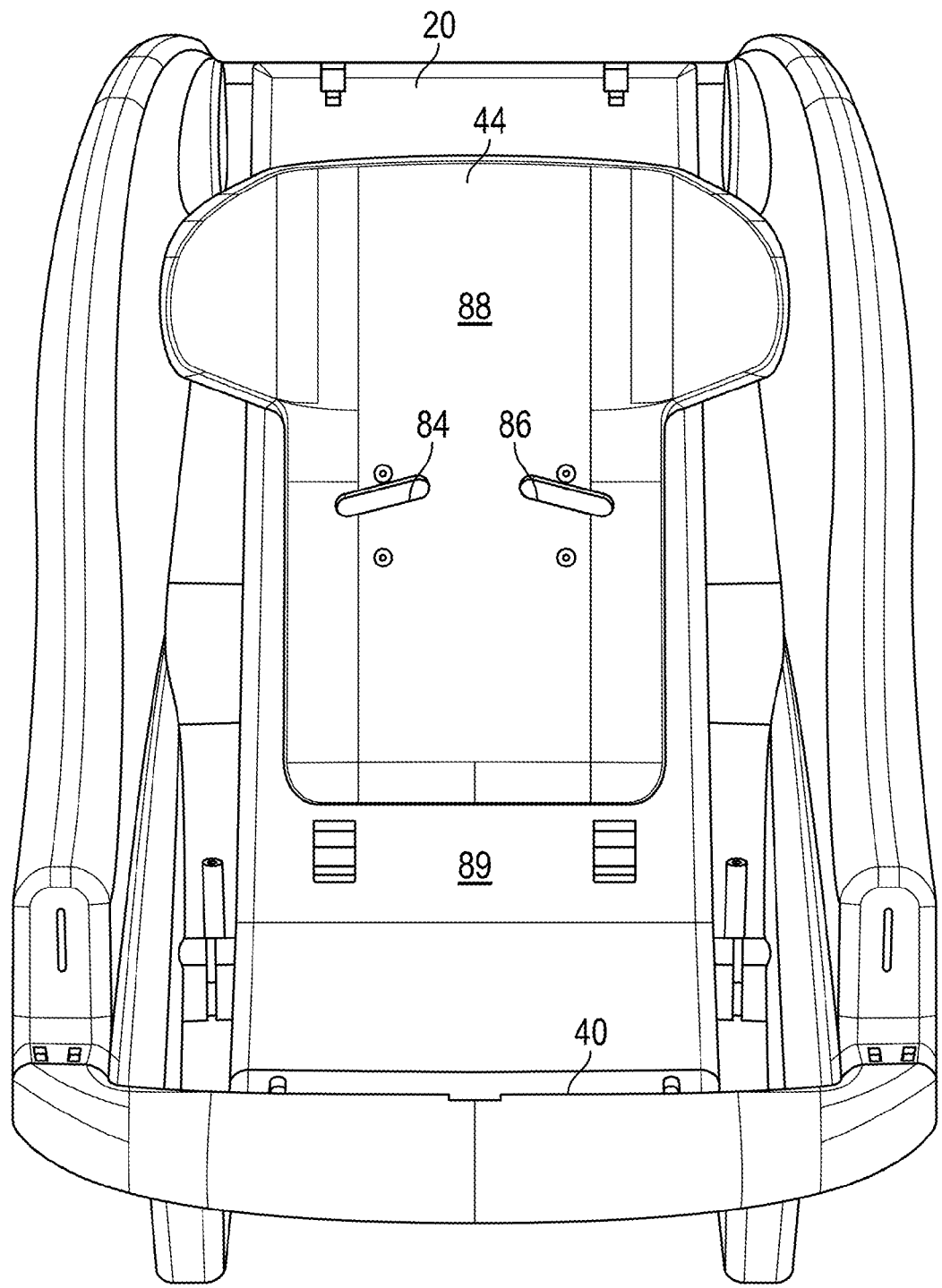
FIG. 3 is a front view of the seat shown in FIG. 1, where a seat cover is removed.

The harness straps 46, 48 may extend in a generally vertical direction between the back support 38 and the seat pan 40. The harness straps 46, 48 may include corresponding upper portions 70, 72 (shown in phantom line) and corresponding lower portions 74, 76. The upper portions 70, 72 of the harness straps 46, 48 may be received by corresponding tubular pads 78, 79 located along the back support 38 of the seat 20. The upper portions 70, 72 of the harness straps 46, 48 may each pass through respective slits 80, 82 (best seen in FIG. 1) located in the seat cover 42 on the back support 38. Referring to FIG. 3, the cover 42 of the seat 20 has been removed, thereby revealing a shell 88 of the headrest 44 and a shell 89 of the seat 20. The shell 88 may have two openings 84, 86 that correspond to one of the slits 80, 82 in the seat cover 42 (shown in FIG. 1). Referring to FIGS. 1 and 3, the upper portions 70, 72 of the harness straps 46, 48 may pass though the respective openings 84, 86 located in the headrest 44.

Figure 4:
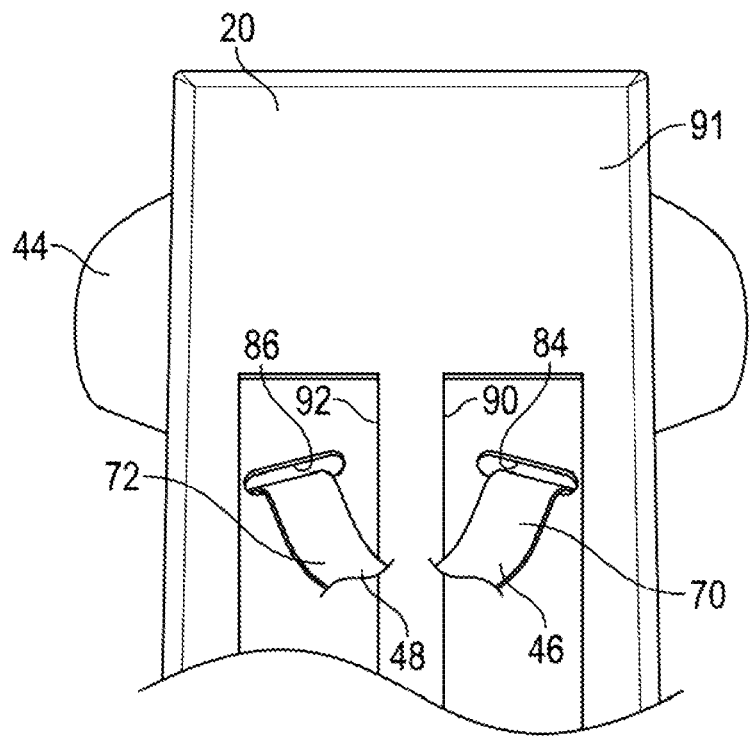
FIG. 4 is a rear detail of a portion of the seat of FIG. 1.

Referring to FIG. 4, a rear surface 91 of the seat 20 may have two vertically extending slots 90, 92 that correspond to the openings 84, 86 in the shell 88 of the headrest 44. The two upper portions 70, 72 of the harness straps 46, 48 may pass through the two slots 90, 92 in the seat 20, and may be received by an adjustment mechanism (not shown). Referring to FIGS. 1 and 4, the adjustment mechanism may be any type of device or combination of devices that move the headrest 44 in the first direction D1 and the second direction D2. Movement of the headrest 44 in the first direction D1 may raise the upper portions 70, 72 of the harness straps 46, 48 relative to the seat pan 40. Likewise, movement of the headrest 44 in the second direction D2 may lower the upper portions 70, 72 of the harness straps 46, 48 relative to the seat pan 40.

Figure 5:
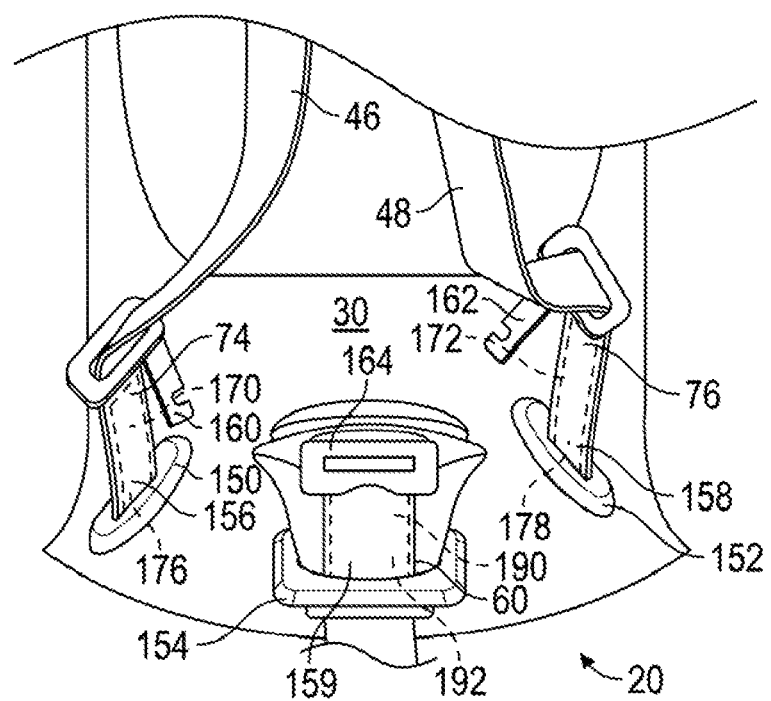
FIG. 5 is a detail of the child seat assembly taken at 'Detail 5' in FIG. 1.

Referring to FIGS. 1-2 and 5, the lower portions 74, 76 of the harness straps 46, 48 may be received by respective openings 150, 152 located along the seat cover 42 at the seat pan 40. A second end 156 of the harness strap 46 and a second end 158 of the harness strap 48 may both be fixedly attached or anchored to the shell 89 of the seat 20 (shown in FIG. 3). The crotch strap 60 may also be received by an opening 154 (shown in FIG. 5) located along the seat cover 42 at the seat pan 40. An end 159 (shown in FIG. 5) of the crotch strap 60 may also be fixedly attached or anchored to the shell 89 of the seat 20 (shown in FIG. 3).

The harness straps 46, 48 may each include respective buckle tongues 160, 162. The buckle tongues 160, 162 may be slidably mounted on one of the harness straps 46, 48. The crotch strap 60 may include a buckle 164 that selectively engages both the buckle tongues 160, 162. Once a child is placed in the seat 20, the harness straps 46, 48 may be positioned over the arms and shoulders of the child. The child may then be secured to the seat 20 by engaging the buckle tongues 160, 162 by a latching mechanism (not shown) located in the buckle 164.

The harness straps 46, 48 may each include respective inserts 170, 172 (the inserts 170, 172 are shown in phantom line in FIG. 5). Referring to FIG. 5, the insert 170 may be located within the lower portion 74 of the strap 46, where a bottom end 176 of the insert 170 may be received by the opening 150 located in the seat cover 42 and may be fixedly attached to the shell 89 of the seat 20 (shown in FIG. 3). The insert 172 may be located within the lower portion 76 of the strap 48, where a bottom end 178 of the insert 130 may be received by the opening 152 located in the seat cover 42 and may be fixedly attached to the shell 89 of the seat 20 (shown in FIG. 3). The inserts 170, 172 may be spring biased elements that are constructed of a relatively flexible material such as, for example, a non-rigid plastic or spring steel. In other embodiments, the inserts may be segments of stiff, curved metallic ribbon, such as is used in a self-retracting tape measure. Specifically, the inserts 170, 172 may be flexible such that when a child is placed in the seat 20, the lower portions 74, 76 of the harness straps 46, 48 may bend or arch across a child's thighs, and the buckle tongues 160, 162 may be received and secured by the buckle 164.

The inserts 170, 172 may extend in a generally upward direction, away from the seat pan 40, and exert a biasing force on the respective harness straps 46, 48. Specifically, referring to FIGS. 1-2, the insert 170 may exert a biasing force on the harness strap 46, which urges the lower portion 74 of the strap 46 in a first biasing direction B1, towards the side 36 of the seat 20. The insert 172 may exert a biasing force on the harness strap 46, which urges the lower portion 76 of the strap 48 in a second biasing direction B2, towards the side 37 of the seat 20. The inserts 170, 172 may be used to position or bias the lower portions 74, 76 of the harness straps 46, 48 and the buckle tongues 160, 162 upwardly, and away from the seat pan 40. In other words, the harness straps 46, 48 "stand proud" to the seat pan 40. Thus, the lower portions 74, 76 of the harness straps 46, 48 and the buckle tongues 160, 162 may not be located along the seat pan 40 when the buckle 164 disengages with the buckle tongues 160, 162. Therefore, when a child is placed in the seat 20, a user may not inadvertently position the child on top of the harness straps 46, 48 or the buckle tongues 160, 162.

Referring to FIGS. 1-2 and 5, the crotch belt 60 may also include an insert 190 (the insert 190 is shown in phantom line in FIG. 5). Referring specifically to FIG. 5, the insert 190 may be located within the crotch strap 60, where a bottom end 192 of the insert 190 may be received by the opening 154 located in the seat cover 42. The insert 190 may also be constructed of the same material as the inserts 170, 172 such that when an adult places a child in the seat 20, the crotch strap 60 may bend or arch towards the back support 38 of the seat 20 to engage the buckle tongues 160, 162.

The insert 190 may extend in a generally upward direction, away from the seat pan 40, and toward the foot end 34 of the seat 20. Specifically, referring to FIGS. 1-2 and 5, the insert 190 may exert a biasing force on the crotch strap 60, which may urge the buckle 124 in a third biasing direction B3, toward the foot end 34 of the seat 20. The inserts 190 may be used to position or bias the crotch strap 60 and the buckle 164 upwardly and towards the foot end 34 of the seat 20. Thus, when an adult places a child in the seat 20, the crotch strap 60 and the buckle 164 may not be located along the seat pan 40. Therefore, when a child is placed in the seat 20, a user may not inadvertently position the child on top of the crotch strap 60 or the buckle 164.

Referring to FIG. 5, in one embodiment, the harness straps 36, 38 may both be constructed of two lengths of seat belt webbing that are sewn to one another. In another embodiment, the harness straps 36, 38 may be constructed of a single, tubular piece of seat belt webbing that may receive one of the inserts 170, 172. Similar techniques also may be used in order to secure the insert 190 within the crotch strap 60.

Figure 6:
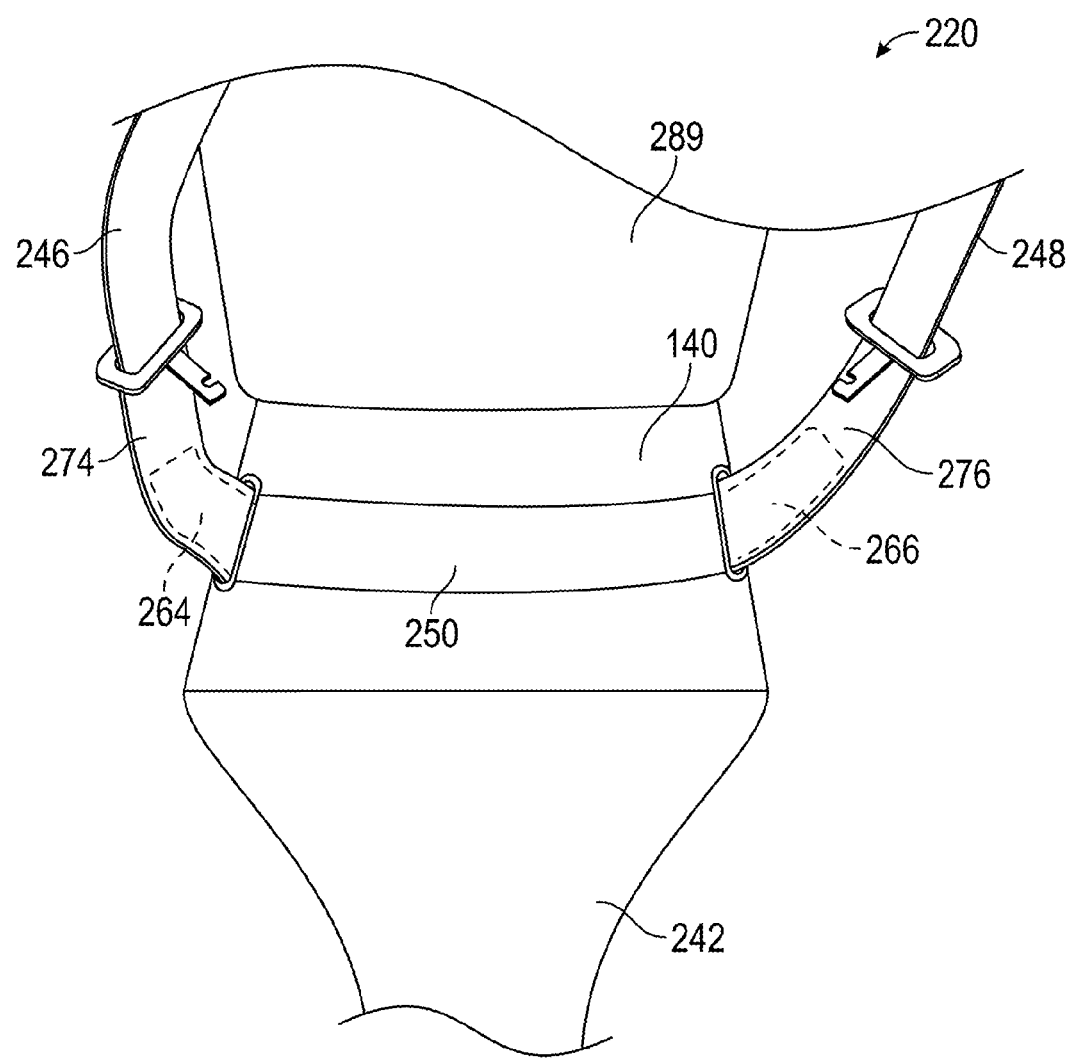
FIG. 6 is an alternative embodiment of the disclosed child seat assembly, where a single insert is included.

FIG. 6 is an alternative embodiment of two harness straps 246, 248. In the embodiment as shown in FIG. 6, a seat cover 242 has been partially removed, thereby revealing a shell 289 of a seat 220. An insert 250 may extend in a generally transverse direction between the two harness straps 246, 248. The insert 250 may be located between the seat cover 242 and the shell 289 of the seat 220. In one embodiment, the insert 250 may be constructed of a relatively flexible material such as, for example, nylon.

The insert 252 may include a first end 264 and a second end 266, where the first end 264 of the insert 250 may extend into a bottom portion 274 of the harness strap 246. Likewise, the second end 266 may extend into a bottom portion 276 of the harness strap 248. Similar to the embodiment as described above and shown in FIGS. 1-5, the insert 250 may be used to exert a biasing force on the respective harness straps 246, 248 such that the harness straps 246, 248 "stand proud" to a seat pan 140. In other words, the insert 250 may be used to position or bias the lower portions 274, 276 of the harness straps 46, 48 upwardly, and away from the seat pan 140.

Figure 7:
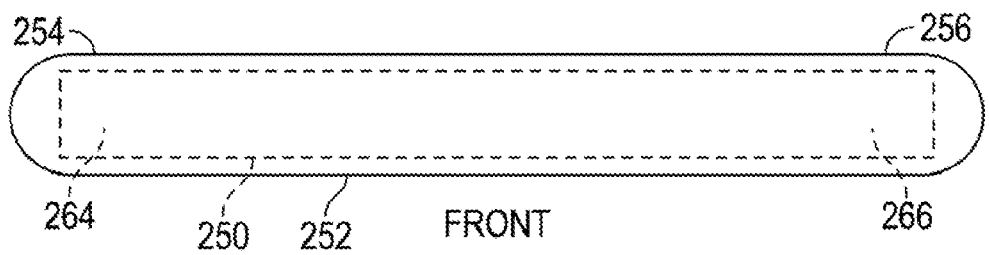
FIG. 7 is a front view of an elongated pad for receiving the insert shown in FIG. 6.
Figure 8:
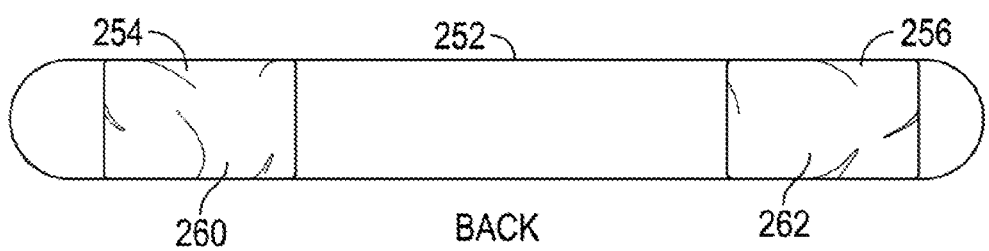
FIG. 8 is a rear view of the elongated pad shown in FIG. 7.

Referring to FIGS. 7-8, in one embodiment the insert 250 may be placed within an elongated pad 252 (the insert 250 is shown in FIG. 7 in phantom line). In the embodiment as shown in FIGS. 7-8, the pad 252 may include a first end portion 254, a second end portion 256, and two slots 260, 262. Each of the slots 260, 262 may be positioned at one of the end portions 254, 256 of the pad 252. In one embodiment, the pad 252 may be filled with a compressible material. The pad 252 may also include a covering that is constructed out of a material such as, for example, fabric. Referring specifically to FIG. 7, the first end 264 of the insert 250 extends into the first end portion 254 of the pad 252. Likewise, the second end 266 of the insert 250 extends into the second end portion 256 of the pad 252.

Figure 9:
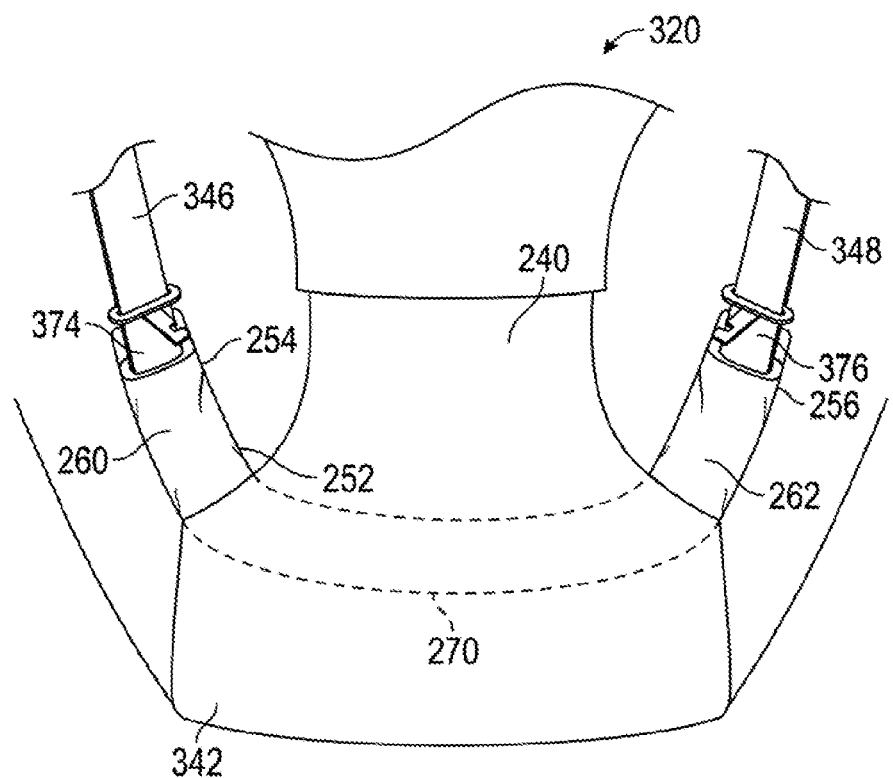
FIG. 9 is an illustration of the elongated pad installed on the child seat assembly.

FIG. 9 is an illustration of the pad 252 assembled in a seat 320. When assembled in the seat 320, a portion 270 of the pad 252 may be placed between a shell of the seat 320 (the shell is not visible in FIG. 9) and a seat cover 342. Specifically, the portion 270 of the pad 252 placed beneath the seat cover 342 is in phantom line. The first end portion 254 and the second end portion 256 of the pad 252 may extend outwardly from beneath the seat cover 342. Referring to both FIGS. 8 and 9, a bottom portion 374 of a harness strap 346 may be received by the slot 260 of the pad 252. Similarly, a remaining bottom portion 376 of a harness strap 348 may be received by the slot 262 of the pad 252. The insert 250 may provide stiffness to the pad 252. Thus, similar to the embodiments as described above and shown in FIGS. 1-6, the harness straps 346, 348 also "stand proud" to a seat pan 240.

Referring generally to the figures, the disclosed inserts may be used to position or bias the lower portions of the harness straps and the crotch strap upwardly, and away from the seat pan. As a result, the harness straps and the crotch strap may not be located along the seat pan when the buckle is disengaged with the buckle tongues. Therefore, when a child is placed in the seat, a user may not inadvertently position the child on top of the harness straps, the buckle tongues, the crotch strap, or the buckle. Some users may experience difficulties when securing a child to a seat using currently available harness straps and a crotch strap that do not include inserts. Specifically, the child may be inadvertently positioned on top of one or both the tongues of the harness straps or the buckle of the crotch strap when the child is placed in the seat. Thus, the tongues and the buckle must be removed from underneath the child's body before securing the child to the seat. In contrast, the disclosed inserts overcome this issue by biasing the harness straps and crotch strap upwardly and away from the seat pan. Therefore, securement of the child to the seat using the disclosed harness and crotch straps may be more convenient and less time-consuming.

While the forms of apparatus and methods herein described constitute preferred aspects of this invention, it is to be understood that the invention is not limited to these precise forms of apparatus and methods, and the changes may be made therein without departing from the scope of the invention.

What is claimed is:

1. A seat assembly, comprising:
a seat having opposing sides, a back support, and a seat pan;
at least two harness straps extending in a generally vertical direction between the back support and the seat pan, the harness straps both having a lower portion and ends, wherein the ends of the harness straps are secured to the seat pan;
a seat cover; and
an insert located between the seat cover and the seat pan that extends in a generally transverse direction between the at least two harness straps, and wherein an end of the insert is coupled to the lower portion of one of the harness straps and another end of the insert is coupled to the lower portion of a remaining one of the harness straps, and wherein the insert exerts a biasing force on both the harness straps to urge the lower portion of both harness straps towards one of the opposing sides of the seat.

2. The seat assembly of claim 1, further comprising an elongated pad that receives the insert.

3. The seat assembly of claim 2, wherein the elongated pad includes two slots, and wherein one of the slots receives the lower portion of one of the harness straps, and a remaining one of the slots receives the lower portion of the remaining one of the harness straps.

4. The seat assembly of claim 1, wherein the insert is constructed of nylon.

5. The seat assembly of claim 1, wherein the harness straps are tubular members.

6. The seat assembly of claim 1, wherein the harness straps are constructed of two lengths of seat belt webbing that are sewn to one another.

7. The seat assembly of claim 1, wherein the seat is one of an infant seat, a convertible seat, a combination seat, a stroller seat, a booster seat, and a high chair seat.

8. The seat assembly of claim 1, wherein the seat is a passenger seat in a motor vehicle or an aircraft.

* * * * *